United States Patent [19]

Olson

[11] 4,220,684
[45] Sep. 2, 1980

[54] COEXTRUDED LAMINAR THERMOPLASTIC BAGS

[75] Inventor: Robert H. Olson, Pittsford, N.Y.

[73] Assignee: Mobil Oil Corporation, New York, N.Y.

[21] Appl. No.: 19,546

[22] Filed: Mar. 12, 1979

[51] Int. Cl.² .................. B65D 31/02; B32B 27/08
[52] U.S. Cl. .................................. 428/35; 428/515; 428/516
[58] Field of Search .............. 428/35, 36, 515, 516

[56] References Cited

U.S. PATENT DOCUMENTS

| 4,104,404 | 8/1978 | Bieler et al. | 428/516 X |
| 4,127,688 | 11/1978 | Bieler et al. | 428/516 X |
| 4,151,318 | 4/1979 | Marshall | 428/35 |

*Primary Examiner*—Thomas J. Herbert, Jr.
*Attorney, Agent, or Firm*—Charles A. Huggett; James D. Tierney

[57] ABSTRACT

A thermoplastic bag particularly adapted for the containment and storage of foods comprising a laminar bag structure having an interior layer of a high density polyethylene and an exterior layer of nylon 6. The layers are lightly bonded together at their interface. Such bag structures are suitable for the containment of foodstuffs while they are being heated or reheated following storage.

3 Claims, No Drawings

COEXTRUDED LAMINAR THERMOPLASTIC BAGS

BACKGROUND OF THE INVENTION

1. Field of the Invention

The present invention relates to thermoplastic bag structures which have been fabricated from a thermoplastic film laminate comprising two layers of film which are formed from dissimilar thermoplastic resins.

2. Description of the Prior Art

In the past, polyethylene bags have been used for food storage and, in particular, refrigerated food storage. Such food container bags are particularly convenient for the storage of food left-overs which may be intended for later reheating. The bulk of such food storage bags have been formed from low density, i.e. 0.91 to about 0.93 g/cc., polyethylene. For reheating purposes, foodstuffs must be removed from such low density polyethylene bags because of their tendency to partially melt and adhere to the surfaces of cooking vessels at temperatures on the order of 212° F. and below.

To remedy this deficiency of low density polyethylene bags, attempts have been made to employ polyester bags, such as polyethylene terephthalate, for such elevated temperature applications as "boil" bags, however such films are difficult to seal and more importantly are prohibitively expensive for such disposable bag applications.

It has been known in the past that laminar film for food packaging may be formed from a laminate of nylon and polyethylene provided that an adhesive inner layer is provided between the polyethylene and the nylon. Such a construction involves a three layer structure and as such presents manufacturing difficulties including the employment of three separate extruders in a manufacturing operation to produce a single film. Such triple layer laminations are disclosed in the October 1978 issue of Plastics Engineering, pages 53 et seq.

SUMMARY OF THE INVENTION

The present invention provides for an economical thermoplastic bag which may be employed to contain foods during storage and, most importantly, may be used to contain such foods during reheating preparatory to serving. The bag structures of the present invention comprise a two layer laminar structure, the inner bag layer, or that surface layer in contact with the foodstuffs, being formed from a high density polyethylene with a density of from about 0.930 up to about 0.96, and preferably a high density polyethylene-olefin copolymer. The outer layer of the bag laminate, or that surface of the bag which comes into direct contact with the cooking or reheating vessel, comprises a ply of relatively thin nylon 6 film. The outer nylon 6 film layer maintains the inner, more thermally susceptible, polyethylene layer out of contact with the surfaces of the cooking vessel and hence improves the bag's ability to withstand higher temperatures. The nylon 6 layer, having a melting or sticking temperature on the order of above 210° C. is stable and will not stick to the vessel side walls while foodstuffs are being reheated therein. Obviously the bag containing foodstuffs is intended to be immersed in a fluid such as water during the reheating operation. Accordingly the present invention provides laminar bags for the storage and containment of foodstuffs which may subsequently be reheated without first removing them from the bag. In a specific embodiment of the present invention the bag is constructed from a two-ply laminate comprising an inner film layer of a high density polyethylene or a high density ethylene-olefin copolymer blended with a samll percentage of an adhesion promoter such as Surlyn 1650 in an amount on the order of from about 5% to 25% by weight and an outer layer of nylon 6 film adhered thereto. The high density ethylene copolymer preferably comprises ethylene which has been copolymerized with a minor amount, on the order of less than 10%, of another olefin such as an α-olefin having from about 3 up to about 10 carbon atoms, for example octene-1.

DESCRIPTION OF SPECIFIC EMBODIMENTS

A tubular thermoplastic laminate was prepared utilizing conventional blown tubular film coextrusion techniques whereby the final inner-tube layer comprised a 0.9 mil thick layer of a mixture of high density polyethylene-octene copolymer with 10% of an ionomer resin, identified by the manufacturer as Surlyn, and a 0.1 mil thick outer layer of nylon 6. The continuous laminar tube was subsequently converted into bag structures utilizing techniques well known in the prior art. The high density polyethylene copolymer component of the inner layer was a copolymer of ethylene and about 3% by weight of octene-1. This resin is identified by the manufacturer as Alathon 7810 and has the following typical physical properties for a 1.25 mil film extruded at a 4.3/1 blow-up ratio:

Density 0.945 g/cc
Melt Index 0.25 g/10 min.
Tensile Yield
 (MD): 3,000 psi
 (TD): 3,100 psi
Elongation (MD): 660%
(2"/min.) (TD): 730%
Secant Modulus
 (MD): 80 M psi
 (TD): 82 M psi
Elmendorf Tear
 (MD): 45 gm/mil
 (TD): 247 gm/mil
Spencer Impact: 2.8 in. lbs/mil
Dart Drop (26"): 115 gm/mil
Tear Propagation (MD): 3.2 Kg force
ASTM D-2582 (TD): 3.7 Kg force The second mixture component of the inner layer was an ionomer resin identified by the manufacturer as Surlyn 1650 and has the following typical average physical properties for a 1 mil blown film extruded at a 2:1 blow-up ratio:

| Property | Film Properties Value | ASTM Test |
| --- | --- | --- |
| Density | .95 g/cc | D792-66 |
| Melt Index | 1.4 g/10 min | D1238-65T |
| Tensile strength | 4000 psi | D882-67 |
| Tensile yield | 1800 psi | D882-67 |
| Elongation | 450% | D882-67 |
| Elmendorf Tear | 80/90 g/mil | D1922-67 |
| Dart Drop (26") | 300 g/mil | D1709-67 |

| Property | Resin Properties Value | ASTM Test |
|---|---|---|
| Density | 0.939 gm/cc | D-1505-68 |
| Melt Flow Index | 4.4 decigm/min | D-1238-65T |
| Tensile strength | 2850 psi | D-638-67 |
| Yield strength | 1870 psi | D-638-67 |
| Elongation | 580% | D-638-67 |

Ionomer resins, well known in the art, may be characterized as a metal-containing ionic copolymer obtained by the reaction between ethylene or an alpha-olefin with an ethylenically unsaturated monocarboxylic acid such as acrylic or methacrylic acid wherein at least 10% of said carboxylic acid groups are neutralized by an alkali metal ion. Such ionomer resins are disclosed in U.S. Pat. No. 3,496,061, the disclosure of which is incorporated herein by reference.

The nylon 6 outer layer was fabricated from resin identified by the manufacturer as CAPRON 8207 which has the following typical physical properties:
Density: 1.13 g/cc
Tensile, Yield: 11,800 psi (ASTM-P-638)
Deflection Temperature: 140° F. (ASTM-D-648) at 264 psi stress The two ply laminated film comprising lightly adhered layers of the high density ethylene-octene-1 copolymer-ionomer mixture and the nylon 6 outer layer had the following physical properties:
Film Gauge: 1.0 mil.
Blow-up Ratio: 4/1
Tensile, Ultimate
  (MD): 8170 psi
  (TD): 4400 psi
Tensile, Yield
  (MD): 2800 psi
  (TD): 3000 psi
Elongation
  (MD): 560%
  (TD): 480%
Tear-Elmendorf
  (MD): 28 gms/mil
  (TD): 440 gms/mil For purposes of the present invention the thickness of the inner high density polyethylene copolymer layer may vary from about 0.5 mils up to about 3.0 mils and is preferably 0.9 mils thick. The outer nylon 6 layer may vary from about 0.05 mil up to about 3.0 mil in thickness and is perferably about 0.1 mil thick.

Although the adhesive promoting resin disclosed in the foregoing specific example for blending with high density polyethylene was an ionomer, other adhesive resins may be employed to the present invention. An adhesive resin may be defined as a resin which has active sites that, when blended with the high density polyethylene resin, will enhance adhesion of the high density polyethylene to another film layer such as nylon 6. Additionally the adhesive resin must be compatible for blending with the high density polyethylene resin. Adhesion promoting resins which may be employed for blending with the high density polyethylene include resins such as vinyl acetate copolymers, ethylene acrylic acid copolymers or resins such as those identified by the manufacturer as Plexar-2B which are reaction products of maleic anhydride as disclosed in Japanese Pat. No. 78/60,946.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A laminar thermoplastic bag, particularly suited for the containment of foodstuffs to be heated in water which is maintained at an elevated temperature up to about 212° F., which consists of a two-layer laminate comprising an outer film layer of nylon-6 and an inner film layer of a mixture of high density polyethylene, having a density of from about 0.930 up to about 0.960, and from about 5 percent up to about 25 percent of weight of an adhesion promoting resin.

2. A laminar bag construction in accordance with claim 1 wherein said high density polyethylene is an ethylene-α-olefin copolymer comprising ethylene copolymerized with less than 10% by weight of octene-1.

3. A bag construction in accordance with claim 1 wherein said adhesion promoting resin comprises about 10% by weight of an ionomer resin based upon the total weight of said film layer.

* * * * *